Feb. 17, 1925. 1,526,566
E. F. REEVES
PACKAGE FOR HANDLING AND TRANSPORTING EGGS
Original Filed Dec. 13, 1921
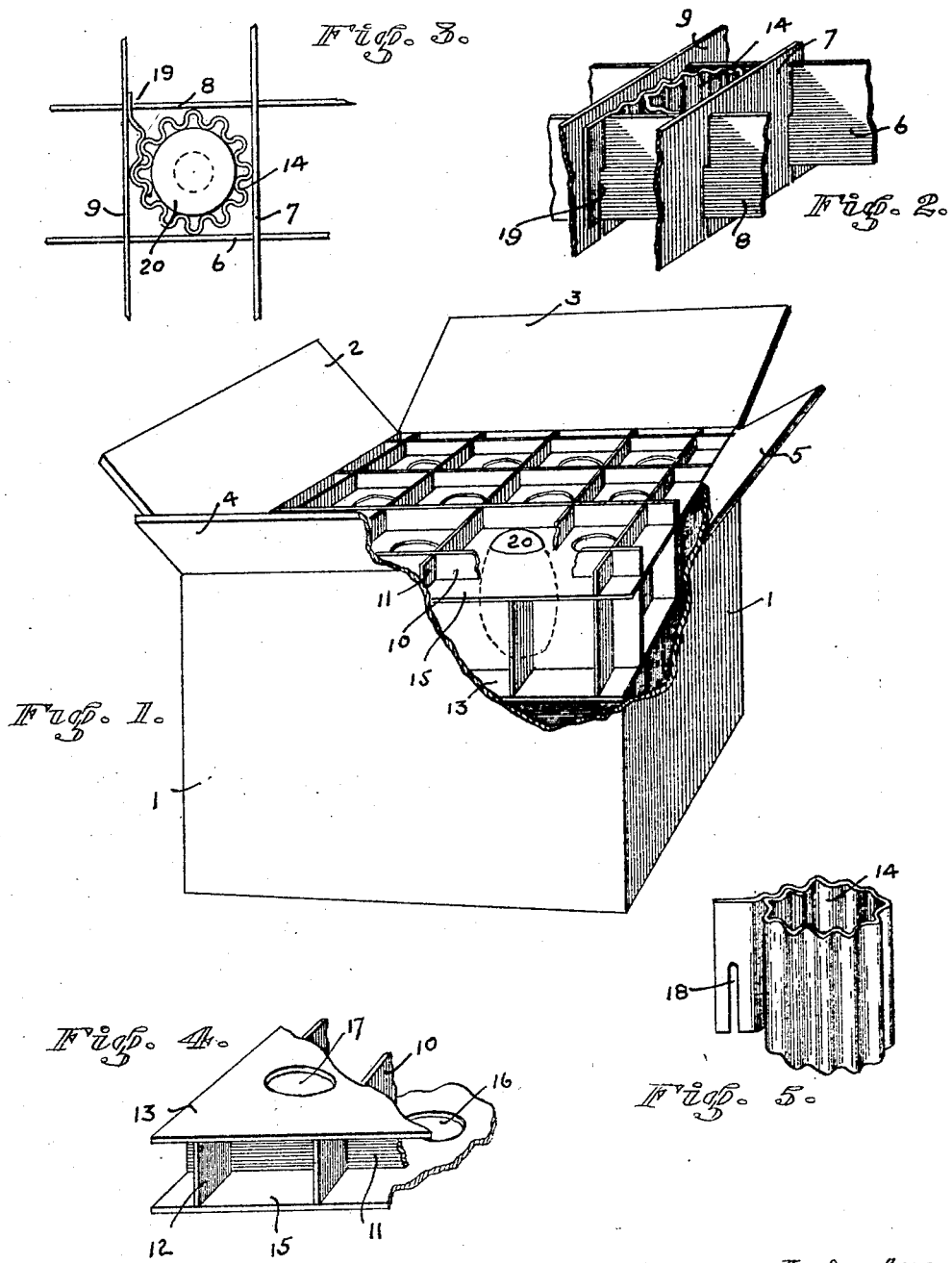

Patented Feb. 17, 1925.

1,526,566

UNITED STATES PATENT OFFICE.

EDWIN F. REEVES, OF SAN FRANCISCO, CALIFORNIA.

PACKAGE FOR HANDLING AND TRANSPORTING EGGS.

Application filed December 13, 1921, Serial No. 521,980. Renewed April 30, 1924.

*To all whom it may concern:*

Be it known that I, EDWIN F. REEVES, a citizen of the United States, and resident of the city and county of San Francisco, State of California, have invented new and useful Improvements in Packages for Handling and Transporting Eggs, of which the following is a specification.

My invention has for its object a package or container in which eggs may be safely packed and shipped without the usual breakage. A further object is the production of such a package which will be suitable for repeated usings and one which may be cheaply constructed and quickly assembled. Other objects will appear from the drawings and specifications.

These objects I attain by a structure of paper or cardboard or the like wherein a series of cells are formed between several members of the structure, and into which cells the eggs are packed. The cell walls are formed with requisite spacings and a wrapping and supporting strip whereby each individual egg is safely protected under the varying conditions of handling and transport. Within the cell walls I employ the said strip as an elastic member which preferably consists of a corrugated strip of paper or the like secured at one of the wall intersections of each cell and which is adapted to wrap around the egg. In this way each individual egg in the package is cushioned or elastically supported against breakage due to strains which may occur radially around the egg. The egg is also supported elastically in the other directions by the partition members mentioned below. The cellular structure may be made up in the conventional way and assembled within a container or box, the outer walls of which box are preferably made of corrugated strawboard or the like, thus providing an outer protecting armor of the requisite stiffness and thickness to safely protect the cellular structure and eggs contained therein. The partition members between the tiers of eggs and which in effect form the top and bottom of each layer of eggs are made up of sheets of cardboard or the like with a plurality of holes corresponding with the plurality of cells and spaced in accordance therewith, so that these holes in the partition members, which holes are smaller than the eggs when the structure is assembled, are spaced at the top and bottom of each egg so that the ends of each egg rest within the said holes, one in each sheet. The sheets of cardboard, that for the top of one layer and that for the bottom of the other layer, are then spaced apart by any suitable means and for this I prefer a set of inter-crossing strips of cardboard on edge similar to but much shorter than those employed in forming the egg cells.

By referring to the accompanying drawings my invention will be made clear.

Fig. 1 is a perspective view of my container adapted to carry two dozen eggs, with certain of the parts broken away to better show the interior construction thereof.

Fig. 2 is a perspective view of one of the cells with the elastic strip shown therein.

Fig. 3 is a plan view of one of the cells with the elastic strip in position and the egg inserted therein.

Fig. 4 is a fragmentary perspective view of one of the partition members comprising a top and a bottom and spacing means therebetween, adapted to locate between the tier of eggs.

Fig. 5 is a perspective view of one of the elastic strips adapted to enwrap the egg.

Throughout the figures similar numerals refer to identical parts.

The box of strawboard or other suitable outer partition material is indicated by the numeral 1 having suitable covers or closure means for the top as indicated by the flaps 2, 3, 4, 5. Within the box 1 is located a criss-cross cell structure composed of a plurality of strips as 6, 7, 8, 9 of Fig. 2 which interlock in the conventional way to form a plurality of cells. In the illustration I have shown a cellular structure so formed and suitable for carrying a dozen eggs in each tier. On the bottom of the box 1 is first placed a spacing member which consists of a plurality of strips as 10, 11, 12, see Fig. 4, dovetail or interconnected at their intersections in the same manner as the member 6, 7, 8, 9, shown in Fig. 2. On top of the supporting frame so made I place a perforated sheet 13. This forms the bottom for the lower tier of eggs.

The cell structure shown in Fig. 2 is then placed on top of this sheet 13 including the elastic strips 14, thus providing a tier suitable for receiving a dozen eggs. When the eggs are placed in these 12 cells their bottoms rest in the holes 17 of the sheet 13; and a complete partition member as shown fragmentarily in Fig. 4 is now placed thereover. This partition member consists of a sheet 15 which is a duplicate of sheet 13 and these two sheets are spaced apart by a duplicate supporting structure made up of strips 10, 11, 12, see Fig. 4. The sheet 15 in this partition member with its holes as 16 elastically supports the top end of each of the eggs in the lower tier and the sheet 13 with its holes 17 provide bottom cavities for the second or upper tier of eggs. A similar cellular structure as shown in Fig. 2 is now placed thereon and thus a second tier of 12 cells is provided and these in turn are covered by a sheet 15 and a supporting frame 10, 11, 12, as before, which fills the case to the top and upon the closure of the flaps 2, 3, 4, 5, the container is complete.

Particular attention is directed to my elastic member 14 and the manner of this formation and arrangement by which the egg is wrapped as shown particularly in Figs. 2, 3, 5. I prefer to make of corrugated cardboard or similar material which gives a strip of considerable elasticity and this strip is punched on one end with a slot 18 adapted to fit over one of the intersections of each of the cell members, as shown at the intersection 19, dovetailed over the strip 8. The corrugated walls of the strip 14 establish a spaced relation between the egg 20 and the cellular walls as 6, 7, 8 and 9, and regardless of the size of the egg 20 the said corrugated strip will lightly but firmly hold the egg in position in the cell. Likewise the sheets 13 and 15 provide elastic support for the top and bottom of each egg.

Reference is herein made to my copending application 441,762 filed Feb. 2, 1921.

I claim:

1. In a package for eggs comprising a plurality of cells an elastically formed strip constructed and adapted to wrap each egg and provided with means to engage the strip in fixed relation with the corresponding cell wall.

2. A package constructed and adapted to contain eggs and comprising a rigid box, a plurality of sheets each having a plurality of spaced openings for holding egg ends, a plurality of wall members dovetailed together forming a cellular structure between the sheets and an elastic wrapping strip within each cell and engaged with the cell wall, and means holding the sheets spaced from the top and bottom of the box.

3. A package for eggs as set forth in claim 2 and wherein there are a plurality of cellular structures each adapted to contain a layer of eggs and said structures spaced apart with top and bottom sheets duplicates of the first named sheet and said top and bottom sheets spaced apart with a shorter cellular structure.

4. A package for eggs comprising a plurality of partitions intercrossing to form cell walls, a bottom member and a top member recessed for receiving the egg ends, means holding said members in spaced relation, an outer casing enclosing the cells, and an expansible strip for each cell engaged with one partition intersection therein and adapted to wrap the egg.

5. A package for eggs comprising a box and a plurality of tiers of cells, a bottom and a top member for each tier and an expansible strip for each cell adapted to engage one partition intersection therein and to wrap the egg, and spacing means between the adjacent members and between the members and the top and bottom of the box.

EDWIN F. REEVES.